E. H. BENJAMIN.
NUT LOCK.
APPLICATION FILED OCT. 5, 1920.

1,376,667.

Patented May 3, 1921.

WITNESSES
Howard J Costello
Wm H Mulligan

INVENTOR
Erlow H. Benjamin
BY
Richard Bowen.
ATTORNEY

UNITED STATES PATENT OFFICE.

ERLON H. BENJAMIN, OF PORT JEFFERSON, NEW YORK.

NUT-LOCK.

1,376,667.    Specification of Letters Patent.    Patented May 3, 1921.

Application filed October 5, 1920. Serial No. 414,838.

*To all whom it may concern:*

Be it known that I, ERLON H. BENJAMIN, citizen of the United States, residing at Port Jefferson, in the county of Suffolk and State of New York, have invented certain new and useful Improvements in Nut-Locks, of which the following is a specification.

This invention relates to nut locks and its primary object is to provide a nut lock which will be locked upon a bolt in a desired position by an automatically operated dog carried by a recess in the nut.

A further object of the invention is a provision of a nut lock which will have a bolt engaging dog adapted to disengage it from the bolt when the nut is rotated in one direction and which will automatically engage the threads of the bolt when it is rotated in the opposite direction.

A further object of this invention is the provision of a nut lock which consists of comparatively few parts, is simple in construction, and durable and well adapted to withstand the rough usage to which the devices of this character are all subjected.

For a full description of the invention the advantages and merits thereof, reference is to be had to the following description and the accompanying drawings, wherein is illustrated the preferred form of my invention, in which.

Figure 1:
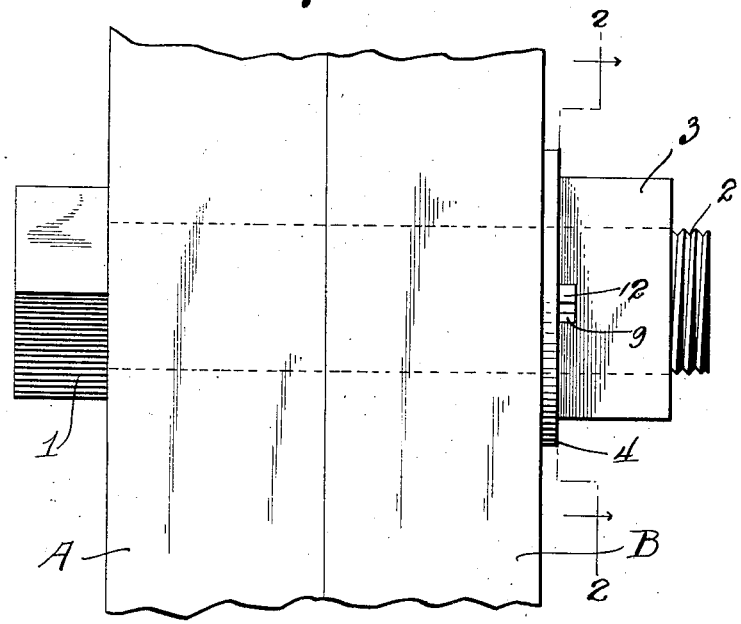
Figure 1 is a side elevation showing the nut lock in applied position.

As shown by Fig. 1 of the drawing, the pieces A and B are bolted together by the bolt 1 which is provided with screw threads 2 upon which the nut 3 is screw threadedly mounted in the usual manner. Interposed between the piece B and the nut 3 is a washer 4 against which the nut 3 operates when it is in applied position.

Figure 2:
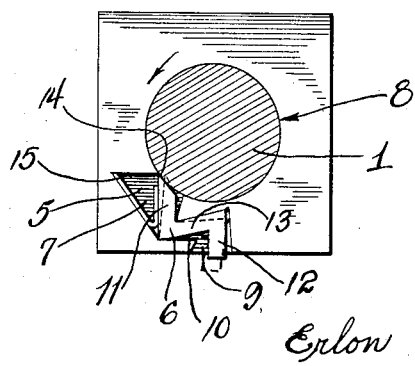
Fig. 2 is a transverse section on the line 2—2 looking in the direction indicated by the arrows.

As shown by Fig. 2 of the drawing, the face of the nut is provided with a peculiarly shaped recess 5 extending into the face of the nut for a depth sufficient to receive a comparatively thin locking dog 6. The main portion or largest part 7 of the recess 5 is, it will be observed from Fig. 2, of substantially triangular shape and communicates with the screw threaded aperture 8 of the nut at one corner. A smaller V-shaped portion 9 of the recess 5 is formed adjacent one of the edges of the face of the nut and communicates with the side of the nut. A communicating portion 10 of the recess establishes a connection between the large V-shaped portion 7 of the recess 5 and the smaller V-shaped portion 9. Superimposed within the recess 5 is the dog 6 which is substantially Z-shaped in formation. The locking arm 11 of the Z-shaped dog 6 is disposed within the enlarged portion 7 of the recess 5 while the operating arm 12 of the dog is disposed within the smaller portion 9 of the recess. A connecting arm 13 of the dog is disposed within the connecting passage 10 and connects the locking arm 11 with the operating arm 12 of the locking dog. The free end of the locking arm 11 is provided with a knife edge 14 formed by beveling the end of the locking arm 11 and this knife edge 14 is adapted to engage the screw threads of the bolt when the locking dog is in an operative position, shown by dotted lines in Fig. 2. Arranged within the enlarged portion 7 of the recess 5 is a flat V-shaped spring 15 which tends to force the locking arm 11 into engagement with the threads of the bolt. The operating arm 12 extends outwardly slightly beyond the side of the nut 3 in a position where it may be operated by a finger of a person who is applying the nut to the bolt.

It will be observed that the locking dog 6 is mounted without resorting to the common expedient of the pivot pin and, by virtue of the peculiar formation of the recess, the dog is held in position where it may be moved into or out of engagement with the threads of the bolt. When the nut has been screw threadedly mounted upon the bolt it will be rotated in the direction indicated by the arrow in Fig. 2 of the drawing; thus the knife edge 14 will rotate on the edge of the screw threads 2 of the bolt until the nut has been screwed to the desired position. Now an attempt to rotate the nut in the opposite direction will be prevented by reason of the knife edge biting into the threads of the bolt, the spring 15 forcing the locking arm 11 against the screw threads until the knife edge effectively bites into the same. When it is desired to remove the nut from the bolt, it may be accomplished by placing the finger on the operating arm 12, thereby holding the locking arm 11 out of engagement with the threads. A monkey-wrench may also be applied to the nut for removing the same and, by having one of the jaws of the wrench engaging the nut of the operating arm 12, the locking arm 11 will be held out of engagement with the threads of the bolt so that the nut may be easily removed in the ordinary manner.

In reduction to practice I have found that the form of my invention illustrated in the drawing and referred to in the above description, as the preferred embodiment, is most efficient and practicable, yet realizing that the conditions concurrent with the adoption of the device will necessarily vary I desire to emphasize the fact that various minor changes in the details of construction, proportion and arrangement of parts may be resorted to, when required, without sacrificing any of the advantages of my invention, as defined in the appended claims.

I claim:—

1. The combination with a bolt and a nut for the bolt, said nut being provided with a recess on one of its faces for establishing communication between the edge of said nut and the threaded aperture in said nut, of a Z-shaped locking dog loosely mounted within said recess and adapted to engage the threads of said bolt.

2. The combination of a bolt and a nut for the bolt, the engaging face of said nut being provided with a comparatively large triangular recess and a smaller triangular recess, each of said recesses being connected by a passage, of a Z-shaped locking dog disposed within said recesses and said passage, the said locking dog adapted to engage the threads of said bolt, and resilient means for holding said dog in engagement with the threads of said bolt.

3. The combination with a bolt and a nut for the bolt, said nut having a pair of communicating triangular recesses formed in one of its faces, of a locking member comprising a locking arm arranged in one of said triangular recesses, an operating arm mounted in the other of said triangular recesses, and a connecting arm mounted in the passage communicating with said triangular recess.

4. The combination with a bolt and a nut for the bolt, said nut having a pair of triangular recesses, of a member comprising a locking arm disposed in one of said triangular recesses, an operating arm in the other of said triangular recesses, and a communicating arm arranged in the passage in the larger of said triangular recesses and resiliently engaging said locking arm.

5. The combination with a bolt and a nut for the bolt, said nut having a pair of triangular recesses, of a locking member comprising a locking arm disposed in one of said triangular recesses, an operating arm in the other of said triangular recesses, a communicating arm arranged in the passage in the larger of said triangular recesses and an operating spring resiliently engaging said locking arm.

In testimony whereof I affix my signature in presence of two witnesses.

ERLON H. BENJAMIN. [L. S.]

Witnesses:
E. A. TOFFIN,
WM. ZEAMAN.